United States Patent [19]

Bardenheuer et al.

[11] 4,264,355

[45] Apr. 28, 1981

[54] METHODS FOR PRODUCING STEEL FROM IRON SPONGE IN ELECTRIC FURNACES

[75] Inventors: Friedrich Bardenheuer, Krefeld; Alois Junker, Dusseldorf; Horst Konig, Duisburg; Gero Rath, Mulheim, all of Fed. Rep. of Germany

[73] Assignee: Mannesmann Aktiengesellschaft, Dusseldorf, Fed. Rep. of Germany

[21] Appl. No.: 72,451

[22] Filed: Sep. 4, 1979

[30] Foreign Application Priority Data

Sep. 25, 1978 [DE] Fed. Rep. of Germany ....... 2841697

[51] Int. Cl.$^3$ ................................................ C21C 5/52
[52] U.S. Cl. ............................................ 75/12; 75/11
[58] Field of Search ................................ 75/12, 11, 26

[56] References Cited

U.S. PATENT DOCUMENTS

| 2,704,247 | 3/1955 | Connor | 75/12 |
| 2,978,315 | 4/1961 | Schenck | 75/26 |
| 2,994,831 | 7/1959 | Old | 75/26 |

Primary Examiner—P. D. Rosenberg
Attorney, Agent, or Firm—Mandeville and Schweitzer

[57] ABSTRACT

A method is provided for producing steel in an economically acceptable fashion from iron sponge with less than 66% Fe and with high acid slag formers. This is achieved by first determining the acid slag forming composition of the iron sponge, and, thereafter, lining an electro-slag-resistance furnace with a lining compatible with the iron sponge composition. Then, the iron sponge is charged to the furnace and the liquid metal formed is withdrawn to a conventional arc furnace, for example, for further processing.

2 Claims, 2 Drawing Figures

METHODS FOR PRODUCING STEEL FROM IRON SPONGE IN ELECTRIC FURNACES

BACKGROUND AND STATEMENT OF THE INVENTION

The invention relates to methods for producing steel from iron sponge with a high percentage of acid in the matrix or composition thereof, whereby the iron sponge is smelted in an electric furnace, the liquid matrix is separated from the liquid metal, and the latter is heated to tapping temperature and finished to be of the desired final quality. Essentially, the following electrothermal methods are employed in the processing of iron sponge to steel:

1. the electric arc furnace method;
2. the induction furnace method;
3. the electro-slag-resistance furnace; and
4. the so-called "Duplex" method, whereby the iron sponge is smelted in a first furnace, and, thereafter, in a second furnace the liquid metal is heated while additives are supplied, and further processed towards the final quality.

The following table serves as a comparison, representing values for iron sponge with the degree of metallizing being 92.5%:

TABLE I

| Fe Content (dry ore) | 60.00% | 62.00% | 64.00% | 66.00% | 68.00% |
|---|---|---|---|---|---|
| Fe Metal (92.50%) | (55.50) | (57.35) | (59.20) | (61.05) | (62.90) |
| $O_2$ (FeO) % | 1.29 | 1.33 | 1.38 | 1.42 | 1.46 |
| Matrix % | 14.20 | 11.34 | 8.48 | 5.62 | 2.76 |
| Iron Sponge total without C | 75.49 | 74.67 | 73.86 | 73.04 | 72.22 |
| C ($O_2 \times 0.75$) | 0.97 | 1.00 | 1.04 | 1.07 | 1.10 |
| Iron Sponge total with C | 76.46 | 75.67 | 74.90 | 74.11 | 73.32 |
| Fe Total | 78.47% | 81.93% | 85.45% | 89.06% | 92.75% |
| $O_2$ | 1.69 | 1.76 | 1.84 | 1.92 | 1.99 |
| C | 1.27 | 1.32 | 1.39 | 1.44 | 1.50 |
| Matrix | 18.57 | 14.99 | 11.32 | 7.58 | 3.76 |
| Total | 100.00 | 100.00 | 100.00 | 100.00 | 100.00 |
| Electric Arc Furnace Method ($CaO/SiO_2 = 2$; Thermal efficiency 80) | | | | | |
| Slag kg/t* Liquid steel | 774 | 588 | 419 | 265 | 125 |
| Lime kg/t* Liquid steel | 277 | 211 | 150 | 95 | 45 |
| Furnace Current KWh/t Liquid steel | 813 | 738 | 670 | 609 | 552 |
| Electro-Slag-Resistance Furnace Method ($CaO/SiO_2 = 1,2$; Thermal efficiency 85) | | | | | |
| Slag kg/t Liquid steel | 564 | 429 | 307 | 195 | 92 |
| Lime kg/t Liquid steel | 136 | 104 | 75 | 47 | 22 |
| Furnace Current KWh/t Liquid steel | 669 | 623 | 580 | 541 | 505 |
| Duplex Method (Electro-Slag-Resistance Furnace/Arc Furnace) ($CaO/SiO_2 = 0.15$; Thermal efficiency 87.5) | | | | | |
| Slag kg/t Liquid steel | 361 | 291 | 226 | 166 | 110 |
| Lime kg/t Liquid steel | 40 | 40 | 40 | 40 | 40 |
| Furnace Current KWh/t Liquid steel | 612 | 595 | 577 | 563 | 548 |

*(kilograms/ton)

Another comparison of the methods mentioned is shown on the graph in FIG. 1. The diagram shows the computed current values in kilograms of slag per ton of liquid steel produced, as well as kilowatt hours per ton of liquid steel produced for the smelting of 100% iron sponge of varying compositions for a metallizing degree of 92.5% for the electric arc furnace method, electro-slag-resistance method, and duplex method with an electro-slag-resistance furnace, and an arc furnace. Basically, the diagram shows the following results: The electric arc furnace arrangement is the most impractical, in view of current consumption. The steep increase in the curve shown for current consumption explains why, from a practical standpoint, iron ores are not processed in electric arc furnace arrangements when the ore is below 66% Fe and when large quantities of steel are to be produced. Also, the electric arc furnace requires a basic slag and, therefore, a high consumption of lime, for the acid iron sponge being processed. This, in turn, involves high thermal losses for tilting the lid and opening the door of the furnace for the additions; and the constant additions, in turn, cause fluctuations in the electric supply lines, all of which influence electric current consumption.

In large-scale industry, the induction furnace is rarely used to smelt iron sponge, since no slag processing is done, and the slag entails considerable problems from the technical point of view, particularly in the case of iron sponge with a high percentage of slag formers.

By contrast, in comparison with the arc furnace, electro-slag-resistance furnaces use substantially less current. This is because there is a substantial decrease in the quantity of lime used in conjunction with the use of a refractory lining selected to conform to the composition of the iron sponge being used.

While the duplex method provides satisfactory results, the initial capital expenditure is prohibitive, and the method becomes complicated when iron sponge low in slag formers is to be processed.

Great problems arise for the processing of iron sponge with a high concentration of slag formers. Iron ores below 66% Fe ($Fe_2O_3$), i.e. iron sponge below 89% Fe, when assuming a metallizing degree of 90%, were, in the past, not used for the production of steel in high percentages, except for special application, since the great quantities of slag, particularly if the matrix of the ores is predominantly of acid character, resulted in excessive current consumption in commonly used electric arc furnaces, in excessive use of refractory material and excessive investment, i.e. the cost of capital was too great.

A method has been disclosed in "Direct Reduction Down Under", Iron and Steel International June 1977, at P. 175, D. A. Bold and N. T. Evans, where the matrix-rich iron sponge is smelted in a metallurgic furnace, the liquid matrix is removed from the process, and then the liquid metal is heated in the same metallurgic furnace to tapping temperature, and is refined and tapped. This method, however, requires great quantities of energy. Other prior art processes are—F. Bardenhaeuer and A. Junker "Quantity-Engergy-and Cost-Balance for the LD Method using different Cooling Agents"—Steel and Iron 97 (1977, No. 18, P. 901 continued), and H. Koenig and G. Rath: "Possibilities of Steel Production with high Iron Sponge Supply in Electro-Slag-Resistance Furnaces"—Steel and Iron 97 (1977) No. 1, P. 12-17.

It is the object of this invention to provide a method for facilitating the processing of iron sponge from ore with low Fe content to steel with low operating costs, particularly current supply costs, low utilization of lime additives, and a considerably reduced wear of the refractory lining. This is achieved in the invention by a method for producing steel from iron sponge high in acid slag formers, characterized by the steps of determining the slag forming composition appropriate for reducing the iron sponge to be processed; selecting an electro-slag-resistance furnace; lining said furnace with a refractory lining compatible with the slag forming composition from said determining step; introducing said iron sponge and said slag forming composition to said furnace lined as in said lining step; maintaining the temperature of said electro-slag-resistance furnace so that the combined liquified slag and iron sponge matrix is at a temperature above the temperature of the liquid interface between said matrix and the formed metal bath of within the range of between about 80°–100° C.; said maintaining step being carried out so as to maintain said liquid matrix 50° C. above the solid-liquid interface between the solid portion of said slag-iron sponge matrix and the liquid portion thereof; withdrawing said liquid metal from said furnace; and further processing said liquid metal in an electric arc furnace; said further processing step being carried out in the presence of heat and conventional metallurgic additives.

In the method of the invention, the iron sponge high in slag formers is smelted in a limited temperature zone in an electro-slag-resistance furnace with refractory lining specifically matched to the matrix or composition of the iron sponge to be processed to separate the slag matrix from the metallic iron. Good results are achieved with the favorable thermal and electric features of the electro-slag-reistance furnace. The liquid iron collecting under the matrix-rich slag is either continuously or at intervals tapped and transferred to another metallurgic facility for further metallurgic processing. Further processing required for the iron corresponds to the procedure common, for example, in the electric arc furnace. However, it can then be processed using much lower quantities of a base supply such as limestone, because the acid components of the original iron sponge are absent.

The refractory lining of the electro-slag-resistance furnace must be selected in accordance with the iron sponge matrix composition. It is composed and selected in accordance with the saturating phase of the matrix so that no detachment of the refractory lining on account of the presence of the slag former matrix takes place. Thus, the lining is largely spared. Furthermore, the furnace vessel may be cooled either by water or by air, externally. The method of this invention, where, among other things, the effect of a foamy slag in the electro-slag-resistance furnace, as described in German Patent DE-AS No. 26 08 320, and/or the intensive water or air cooling of the furnace duct are utilized, permits processing without enrichment of the slag with lime. The yield of lower iron containing ores is increased by means of this method and makes it economically attractive. Further economic advantages are achieved due to the fact that the electro-slag-resistance furnace can operate with electrodes of Soderberg mass which are much less expensive than regular graphite electrodes.

A great advantage of the method of this invention is its flexibility, in that the lining of the electro-slag-resistance furnace can be selected and/or changed or adjusted to conform to a variety of ore compositions. Moreover, favorable results achieved are of extreme importance for countries, and especially developing countries, with a Fe content which previously did not allow the utilization of their own iron ore deposits due to involved and expensive procedures required to achieve a desired product.

The scope of the invention here, it should be understood, extends not only to the application of high slag forming ores, but also to iron-containing waste products of industry, such as, for example, metallic dust, metallic sludge, and so forth.

DESCRIPTION OF THE INVENTION

Figure 1:
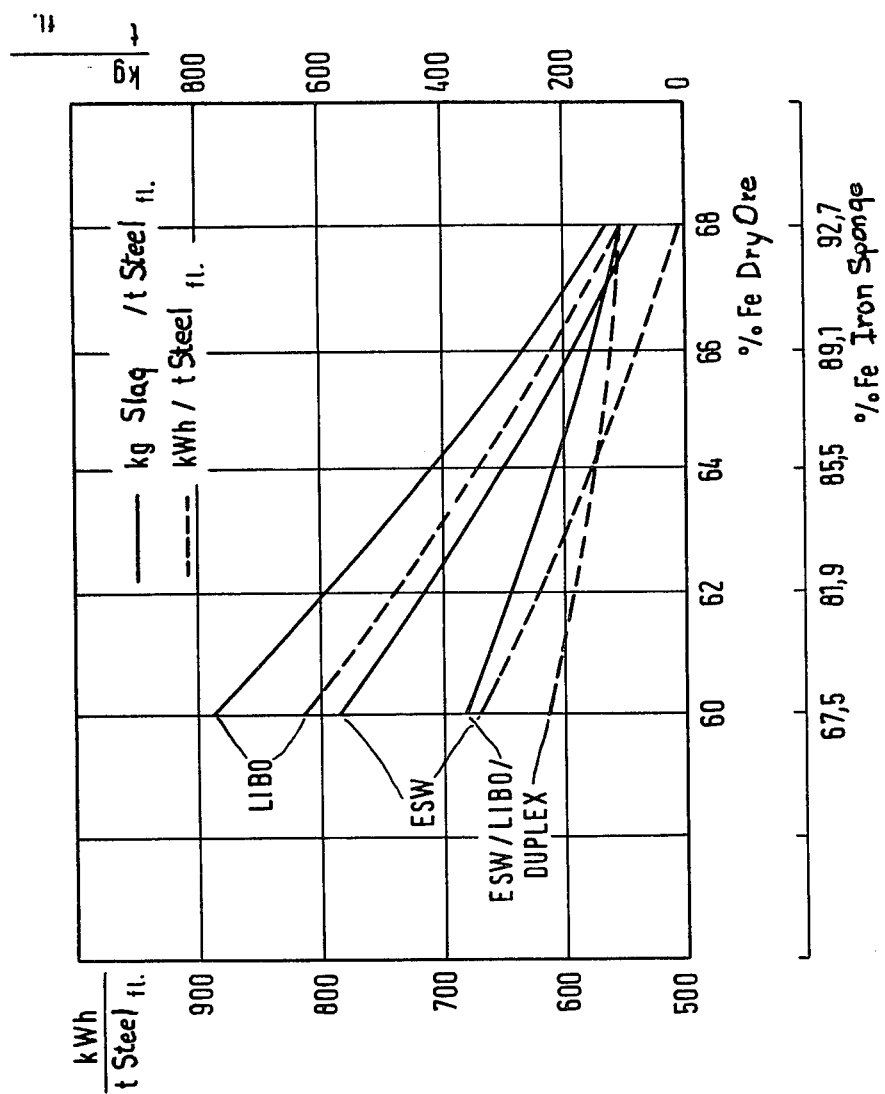
FIG. 1 is a graphic illustration comparing the use of electric current used and quantities of ore required to produce a specific quantity of steel from a representative sponge iron with a high slag forming composition.
Figure 2:
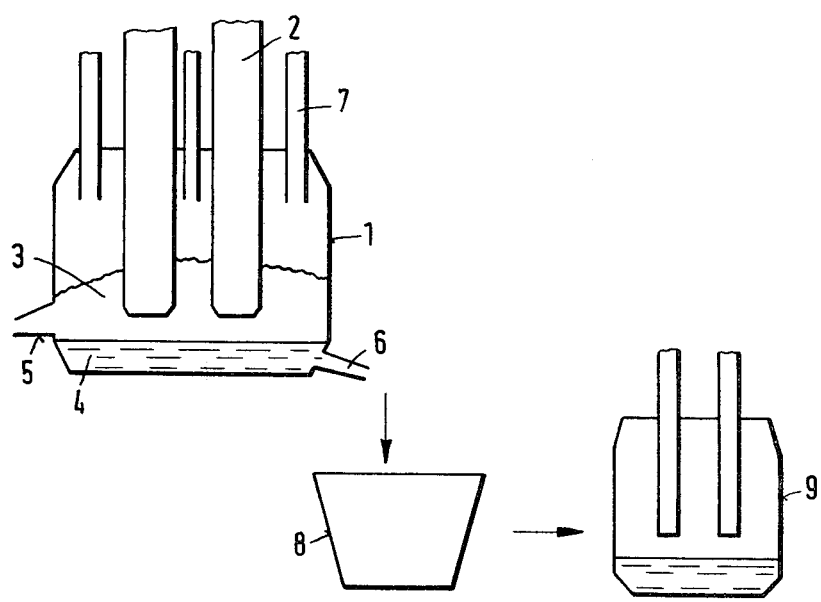
FIG. 2 is a schematic illustration of apparatus which may be used for carrying out the method of the invention.

Referring to FIG. 2, 1 stands for an electro-slag-resistance furnace. The electrodes 2 are immersed in the slag layer 3. In the lower portion of the furnace vessel is the metal bath 4. The tap 5 for the slag is arranged at a higher level than the metal tap 6. The prereduced iron sponge is fed to the furnace 1 via feed pipes 7. The liquid metal 4 is tapped and transferred to a preheated pan 8, and transferred from 8 to a conventional arc furnace 9, for further processing. Alternatively, an electromagnetic passage could be used for the transfer, for example.

We claim:
1. A two-stage method for producing steel from iron sponge high in acid slag formers, comprising the steps of
   (a) determining the slag forming composition appropriate for reducing the iron sponge to be processed;
   (b) selecting as a first-stage furnace an electro-slag-resistance furnace;
   (c) lining said first-stage furnace with a refractory lining selected in accordance with the composition of the gangue of the iron sponge to be processed so that little detachment of the refractory lining on account of the presence of the iron sponge takes place;
   (d) introducing said iron sponge in solid particulate form and said slag forming composition to said first-stage furnace lined as in said lining step;
   (e) maintaining the temperature of said first-stage furnace so that the combined liquefied slag and iron sponge matrix is at a temperature of within the range of between about 80°–100° C. above the temperature of the liquid interface between said matrix and the formed metal bath;
   (f) said maintaining step being carried out so as to maintain said liquid matrix 50° C. above the solid-liquid interface between the solid portion of said slag-iron sponge matrix and the liquid portion thereof;
   (g) separating the liquid gangue from the formed metal bath by withdrawing said liquid metal from said first-stage furnace; and
   (h) introducing said formed metal into a second stage of further processing in a second furnace, said second furnace being an electric arc furnace;

(i) said further processing step being carried out in the presence of heat and conventional metallurgic additives.

2. The method of claim 1, further comprising the step of
 (a) adding small corrective quantities of materials to said matrix to correct the smelting point of the slag to be tapped.

* * * * *